US009587960B2

(12) United States Patent
Markiton et al.

(10) Patent No.: US 9,587,960 B2
(45) Date of Patent: Mar. 7, 2017

(54) SYSTEM FOR PILOTING AN AIRCRAFT, AT LEAST FOR PILOTING THE AIRCRAFT DURING AN AUTONOMOUS APPROACH FOR THE PURPOSE OF LANDING

(75) Inventors: Vincent Markiton, Fontenilles (FR); Franck Laine, Colomiers (FR); Edith Renault, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1623 days.

(21) Appl. No.: 12/095,250

(22) PCT Filed: Jan. 10, 2007

(86) PCT No.: PCT/FR2007/000037
§ 371 (c)(1),
(2), (4) Date: May 28, 2008

(87) PCT Pub. No.: WO2007/080314
PCT Pub. Date: Jul. 19, 2007

(65) Prior Publication Data
US 2008/0319591 A1  Dec. 25, 2008

(30) Foreign Application Priority Data
Jan. 11, 2006  (FR) ..................................... 06 00247

(51) Int. Cl.
*G01S 19/15*  (2010.01)
*G01C 23/00*  (2006.01)
*G08G 5/02*  (2006.01)
*G05D 1/06*  (2006.01)

(52) U.S. Cl.
CPC .......... *G01C 23/00* (2013.01); *G05D 1/0676* (2013.01); *G08G 5/025* (2013.01); *G01S 19/15* (2013.01)

(58) Field of Classification Search
USPC ................ 340/947–948, 963, 971–976, 979; 701/16, 17, 1–4, 7–8, 11, 18, 400, 701/408–412; 342/33–35; 244/75.1, 244/76 R, 175, 183–185, 190, 195–197
See application file for complete search history.

(56) References Cited

U.S. PATENT DOCUMENTS 3,696,671 A * 10/1972 Steigleder et al. ......... 73/178 R
4,385,354 A *  5/1983 Hornfeld et al. ............ 701/17
5,136,297 A *  8/1992 Lux et al. ...................... 342/64
(Continued)

FOREIGN PATENT DOCUMENTS

FR          2 852 686        9/2004

OTHER PUBLICATIONS

International Search Report dated Aug. 17, 2007 w/ English translation.
(Continued)

*Primary Examiner* — John Q Nguyen
*Assistant Examiner* — Anshul Sood
(74) *Attorney, Agent, or Firm* — Dickinson Wright PLLC.

(57) ABSTRACT

A system for piloting an aircraft during an autonomous approach for the purpose of landing. The piloting system has a flight guidance computer that directly computes, with the aid of a position indication and of information characterizing a virtual approach axis, linear deviations. Another computer computes aircraft piloting instructions using the linear deviations.

4 Claims, 1 Drawing Sheet

(56) References Cited

U.S. PATENT DOCUMENTS

| | | | |
|---|---|---|---|
| 5,654,890 A * | 8/1997 | Nicosia et al. | 701/16 |
| 6,040,798 A * | 3/2000 | Kinal et al. | 342/357.21 |
| 6,178,363 B1 * | 1/2001 | McIntyre et al. | 701/16 |
| 6,342,853 B1 | 1/2002 | Kalafus | |
| 6,570,531 B1 * | 5/2003 | Stratton et al. | 342/357.53 |
| 6,629,023 B1 * | 9/2003 | Silder et al. | 701/16 |
| 6,711,479 B1 * | 3/2004 | Staggs | 701/16 |
| 6,845,304 B1 * | 1/2005 | Young | 701/16 |
| 7,084,785 B2 * | 8/2006 | Rouquette et al. | 340/972 |
| 7,286,077 B2 * | 10/2007 | Falcati et al. | 342/33 |
| 7,715,955 B2 * | 5/2010 | Tatham et al. | 701/16 |
| 2001/0020214 A1 * | 9/2001 | Brenner | 701/213 |
| 2002/0004692 A1 * | 1/2002 | Nicosia et al. | 701/16 |
| 2003/0135327 A1 * | 7/2003 | Levine et al. | 701/220 |
| 2004/0199304 A1 * | 10/2004 | Tatham et al. | 701/16 |
| 2004/0220733 A1 * | 11/2004 | Pasturel et al. | 701/214 |
| 2006/0097895 A1 * | 5/2006 | Reynolds et al. | 340/961 |
| 2006/0132358 A1 * | 6/2006 | Holderle et al. | 342/357.02 |
| 2007/0106433 A1 * | 5/2007 | He | 701/16 |

OTHER PUBLICATIONS

Written Opinion of the International Searching Authority w/ English translation.

* cited by examiner

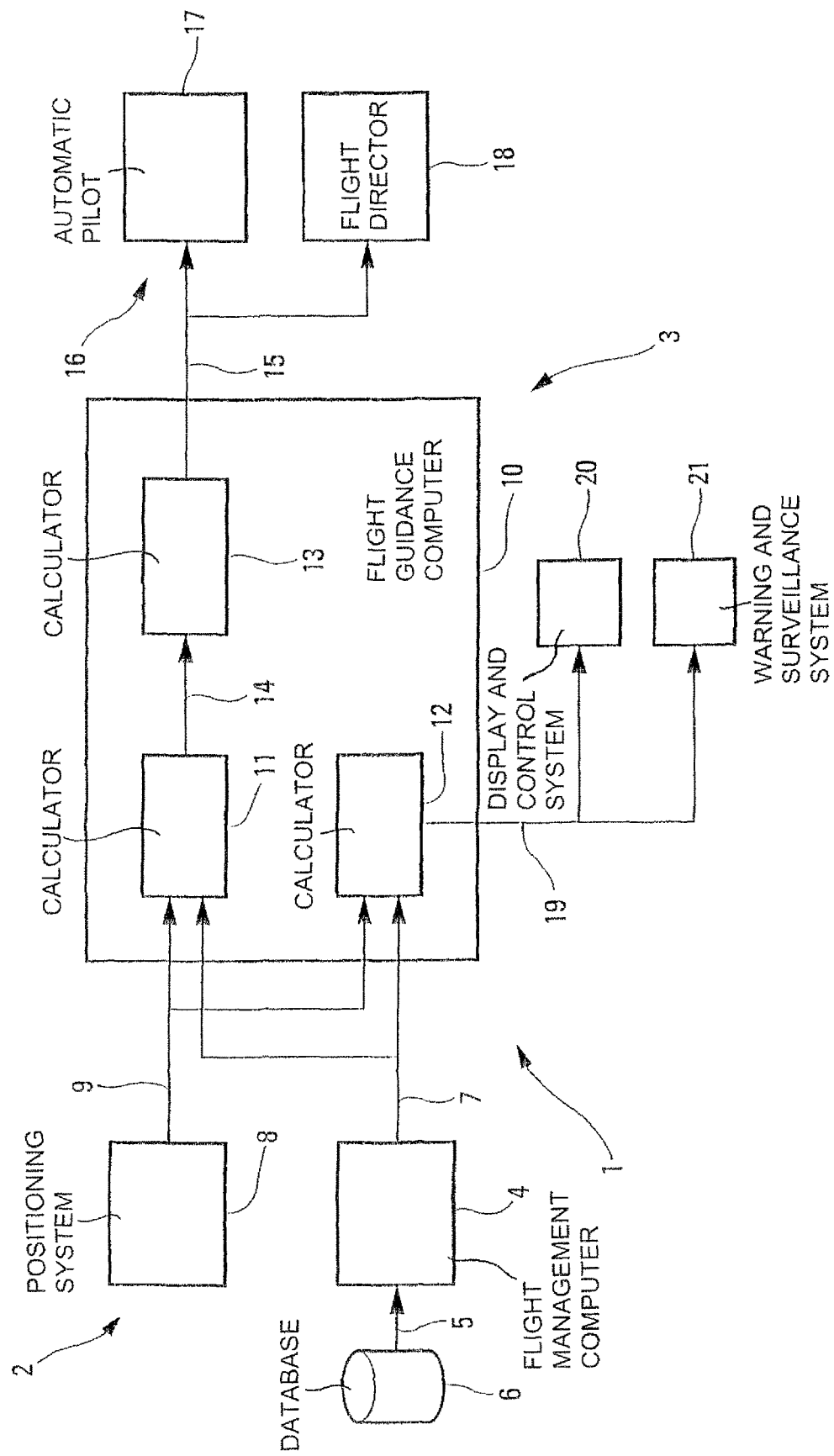

SYSTEM FOR PILOTING AN AIRCRAFT, AT LEAST FOR PILOTING THE AIRCRAFT DURING AN AUTONOMOUS APPROACH FOR THE PURPOSE OF LANDING

FIELD OF THE INVENTION

The present invention relates to a system for piloting an aircraft, at least for piloting the aircraft during an autonomous approach for the purpose of landing, in particular in the military sector.

BACKGROUND OF THE RELATED ART

An autonomous approach must make it possible to fly the aircraft under instrument-based meteorological flight conditions of IMC ("Instrument Meteorological Conditions") type, up to a decision height, for example 200 feet (about 60 meters), which corresponds to the decision height for a precision approach of ILS ("Instrument Landing System") type, without using navigation means situated on the ground. During an autonomous approach such as this, the positioning means used by the aircraft are therefore exclusively onboard means, and in particular a satellite-based positioning system, for example of GPS ("Global Positioning System") type, an inertial platform, and barometric sensors. The approach can also be carried out without an air space controller. At said decision height, the crew of the aircraft must visually acquire the runway. If such is the case, they finish the landing in visual mode with the aid of manual guidance. On the other hand, if at this decision height, the crew do not see the runway, they must perform a go-around so as to make the aircraft climb back up to a predetermined safety altitude. The approach trajectory used to carry out an autonomous approach such as this is created before the flight and described on a paper chart which is at the disposal of the crew in the course of the flight. Accordingly, the configuration of the terrain around the landing runway has been analyzed and margins in relation to obstacles have been defined. This approach trajectory is also saved in a database of the aircraft piloting system.

Document FR-2 852 686 discloses a system for piloting an aircraft intended to pilot the aircraft during a non-precision approach. This piloting system is used especially in the civil sector. A standard piloting system such as this, which therefore relates to a non-precision approach, presents a major objective common to an autonomous approach such as considered in the present invention, namely that said piloting system must be autonomous in relation to the navigation means situated on the ground and must thus be able to carry out the approach at any location on the terrestrial globe.

A standard piloting system such as this, intended for a non-precision approach, generally comprises:
- a flight management system of FMS type ("Flight Management System"), which determines the actual position of the aircraft, doing so:
  - in the nominal case, by performing a GPS ("Global Positioning System") information hybridization of a multi-mode landing aid receiver of MMR ("Multi Mode Receiver") type with inertial information arising from an inertial reference unit; and
  - in degraded cases, by performing a hybridization of the inertial information with radionavigation information;
- a multi-mode landing aid receiver, of MMR type, which receives, in particular from said flight management system, the actual position of the aircraft and information making it possible to characterize a virtual approach axis, and which on the basis of this information determines lateral and vertical angular deviations between the actual position of the aircraft and the position that it would have if it were on said virtual approach axis;
- a flight guidance computer of FG ("Flight Guidance") type which calculates, on the basis of the angular deviations received from said multi-mode landing aid receiver, and on the basis of the distance with respect to the axis of the landing runway, linear deviations and which uses these linear deviations to calculate, with the aid of at least one standard piloting law, aircraft guidance setpoints; and
- at least one piloting aid device, for example an automatic pilot or a flight director, which allows the guidance of the aircraft up to the landing thereof, in accordance with said flight setpoints, doing so either automatically (automatic pilot), or manually (flight director).

It will be noted however that the objectives of an autonomous approach, in particular in the military sector, are more ambitious than those of a non-precision approach of aforesaid type in the civil sector. In particular, the decision heights envisaged are a minimum of 200 feet (about 60 meters) for an autonomous approach, while they are a minimum of 250 feet (about 75 meters) for a non-precision approach. Consequently, the safety cone in which the aircraft must remain in order to perform the approach is smaller in an autonomous approach than in a non-precision approach. Moreover, in an autonomous approach, the absence of any air traffic controller removes a surveillance means, as compared with the situation existing for a non-precision approach in the civil sector.

Thus, the standard piloting system of aforesaid type, which is very appropriate for piloting an aircraft during a non-precision approach, makes it possible to guarantee:
- neither the upkeep of the performance demanded for an autonomous approach, the most constraining performance being the integrity and precision of the vertical positioning of the aircraft, as well as the flexibility of the automatic pilot making it possible to capture segments of short length and to precisely maintain small and large slopes;
- nor compliance with the critical nature of certain parameters (in particular the virtual approach axis according to which the aircraft will be guided, as well as the three-dimensional position of said aircraft) used by the piloting system.

SUMMARY OF THE INVENTION

The object of the present invention is to remedy these drawbacks. It relates to a piloting system making it possible to implement an autonomous approach of aforesaid type, guaranteeing at one and the same time the upkeep of the performance demanded and compliance with the critical nature of certain parameters used.

For this purpose, according to the invention, said piloting system of the type comprising at least:
- information sources which provide at least one position indication relating to the actual three-dimensional position of the aircraft and information making it possible to characterize a virtual approach axis; and
- processing means which process information arising from said information sources, which are capable of determining deviations between the actual position of the aircraft and the position that it would have if it were on said virtual approach axis, and which use the results of these processings, is noteworthy in that said processing means form part of a flight guidance computer which comprises:

a first calculation means for directly calculating with the aid of said position indication and of said information characterizing the virtual approach axis, linear deviations (or metrics) between the actual position of the aircraft and said virtual approach axis;

a second calculation means for directly calculating with the aid of said position indication and of said information characterizing the virtual approach axis, lateral and vertical angular deviations between the actual position of the aircraft and the position that it would have if it were on said virtual approach axis; and a third calculation means for calculating, with the aid of the linear deviations calculated by said first calculation means, aircraft piloting setpoints.

Thus, by virtue of the invention, the piloting system does not comprise any multi-mode landing aid receiver in contradistinction to an aforesaid standard piloting system, and the flight guidance computer directly calculates, with the aid of the position indication and of the information characterizing the virtual approach axis, the linear deviations which are used to calculate the piloting setpoints. This avoids carrying out conversions of angular deviations into linear deviations, such as carried out in the aforesaid standard piloting system. The piloting system in accordance with the invention also makes it possible to increase the flexibility of a piloting aid means, in particular an automatic pilot, used.

Moreover, the fact of carrying out the calculation of the linear deviations and the calculation of the setpoints of the guidance in one and the same flight guidance computer makes it possible to decrease the latency times.

Consequently, by virtue of the piloting system in accordance with the invention, the guidance is optimized so as to be able to fly with the same guidance laws for small slopes and for large slopes and to be able to capture relatively short approach axes.

Furthermore, as the piloting system in accordance with the invention does not comprise any multi-mode landing aid receiver (in contradistinction to the aforesaid standard piloting system), it exhibits a simplified architecture.

Furthermore, advantageously, said information sources comprise:

a flight management computer which is associated with a database containing at least said information making it possible to characterize said virtual approach axis; and/or a positioning system making it possible to determine the actual three-dimensional position of the aircraft, solely with the aid of onboard means.

In a particular embodiment, the piloting system in accordance with the invention comprises, moreover, at least one piloting aid means, for example an automatic pilot or a flight director, which is connected to said flight guidance computer and which uses said guidance setpoints to aid in guiding the aircraft.

Furthermore, said piloting system comprises, moreover, auxiliary means which are connected to said flight guidance computer and which use said lateral and vertical angular deviations, namely in particular a control and display system of CDS ("Control and Display System") type which displays the angular deviations on at least one screen of the flight deck or a flight surveillance system of FWS ("Flight Warning System") type which uses said angular deviations to carry out surveillance.

BRIEF DESCRIPTION OF THE DRAWING

The single FIGURE of the appended drawing will clearly elucidate the manner in which the invention may be carried out. This single FIGURE is the schematic diagram of a piloting system in accordance with the invention.

DETAILED DESCRIPTION OF THE INVENTION

The system 1 in accordance with the invention and schematically represented in the FIGURE, is intended for piloting an aircraft, in particular a military transport airplane. More particularly, its aim is at least to pilot the aircraft during an autonomous approach (that is to say in the absence of information making it possible to implement a standard instrument precision approach) for the purpose of landing on a landing runway (not represented).

Said piloting system 1 which is onboard said aircraft (not represented), is of the type comprising:

information sources 2 specified below, which generate at least one position indication relating to the actual three-dimensional position of the aircraft, as well as information making it possible to characterize a virtual approach axis, for the approach to the landing runway. Of course, this information, considered in the autonomous approach of the present invention, does not comprise any data arising from guidance stations situated on the ground, as in the case of an instrument precision approach for example; and processing means 3 which receive the aforesaid information from the information sources 2, which are capable of determining deviations between the actual position of the aircraft and the position that it would have if it were on said virtual approach axis, and which use the results of these processings as specified below.

In a particular embodiment, said information sources 2 comprise:

a flight management computer 4, of FMS ("Flight Management System") type for example, which is connected:

by way of a link 5 to a database 6 which contains at least said information making it possible to characterize said virtual approach axis; and by way of a link 7 to said means 3; and a positioning system 8, which is connected by way of a link 9 to said means 3 and which is formed so as to determine the current actual three-dimensional position (that is to say latitude, longitude and altitude) of the aircraft, doing so solely with the aid of onboard means specified below.

According to the invention, said processing means 3 form part of a flight guidance computer 10 of FG ("flight guidance") type, which comprises:

a calculation means 11 which is connected by way of the link 7 to said flight management system 4 and by way of the link 9 to said positioning system 8, which receives said position indication from said positioning system 8 and the information characterizing the virtual approach axis from said flight management system 4 (which extracts this information from the database 6), and which directly calculates with the aid of all this information, in the manner specified below, linear deviations (or metrics). These linear deviations represent the perpendicular linear distances (expressed for example in meters) between the actual position of the aircraft and the virtual approach axis, a first distance being calculated in the horizontal plane and a second distance being calculated in the vertical plane;

a calculation means 12 which is linked to said links 7 and 9 and which calculates, with the aid of the aforesaid information, in a standard manner, lateral and vertical angular deviations between the actual position of the aircraft and the position that it would have if it were on said virtual approach axis; and a calculation means 13 which is connected by way of a link 14 to said calculation means 11 and which is formed so as to calculate, directly with the aid of the linear deviations received from said calculation means 11, aircraft piloting setpoints, the piloting setpoints thus calculated being able to be transmitted by way of a link 15 to piloting aid means 16.

Said means 16 use the piloting setpoints received from said flight guidance computer 10 to allow the guidance of the aircraft up to the landing thereof, either directly (said means 16 can comprise for this purpose a standard automatic pilot 17) or indirectly (said means 16 can then comprise a standard flight director 18, to present the piloting setpoints to the pilot who in this case carries out the guidance manually).

In contradistinction to a standard piloting system making it possible to pilot the aircraft during a non-precision approach, the vertical and lateral angular deviations which are calculated in a standard manner by the calculation means 12 are not used to determine the linear deviations (which are calculated directly by the calculation means 11 within the framework of the present invention). However, these lateral and vertical angular deviations can be transmitted, by way of a link 19, to user devices, and in particular:

to a display and control system 20, for example of CDS ("Control and Display System") type, which displays said angular deviations on at least one screen of the flight deck of the aircraft; and a warning and surveillance system 21, for example of the FWS ("Flight Warning System") type, which uses these deviations to carry out standard surveillance.

Thus, when during a flight of the aircraft the pilot desires to carry out an autonomous approach (following a virtual approach axis) for the purpose of landing on a runway, he selects this approach mode with the aid of a man/machine interface provided in a standard manner on the flight management system 4. Said flight system 4 then extracts the information making it possible to characterize the virtual approach axis from the database 6 which is an aircraft navigation database. This information is transmitted in real time to the flight guidance computer 10. The positioning system 8 also provides said flight guidance computer 10, in real time, with the current actual three-dimensional position of the aircraft, which comprises the position in two dimensions (latitude, longitude) in the horizontal plane as well as the geometric altitude. With the aid of said approach axis and of said three-dimensional position, the flight guidance computer 10 calculates at one and the same time:

angular deviations which are displayed on a screen of the display and control system 20 and which are used for surveillance by the warning system 21; and linear deviations that said flight guidance computer 10 uses to determine the piloting setpoints which are transmitted by way of the link 15 to the user means 16.

The specific feature of the architecture of the piloting system 1 in accordance with the invention (used for an autonomous approach) is the fact that the linear deviations are calculated directly in the flight guidance computer 10, thereby making it possible to optimize the guidance chain.

In a particular embodiment, said positioning system 8 comprises, to determine the current actual position in 3D of the aircraft;

a satellite-based positioning device;

barometric sensors; and the inertial platforms of the aircraft.

A GPS system ("Global Positioning System") of military type is preferably used as satellite-based positioning device. However, it is also conceivable to use a global satellite navigation system of GNSS ("Global Navigation Satellite System") type, an augmentation system based on satellites of SBAS ("Satellite Based Augmentation System") type or a satellite-based positioning system of GALILEO type.

In a particular embodiment, said positioning system 8 and said flight guidance computer 10 are each embodied on the basis of three elements, namely three positioning units and three computers. In this case, each of the three positioning units calculates a position in two dimensions and a hybrid altitude that it dispatches to the three computers. Each computer consolidates a position in two dimensions and an altitude on the basis of the three data items received. The positioning system 8 determines, as a function of technical considerations such as the constellation of the satellites, a precision and an integrity level for the calculated positions. If these parameters are below the performance required for an autonomous approach, the positioning system 8 dispatches a message to the flight management computer 4 which declares the autonomous approach unavailable to the crew, for example by way of a display in particular on a screen of the display and control system 20. The previous characteristics make it possible to secure the use of the three-dimensional position of the aircraft in the guidance. Moreover, the direct use of this three-dimensional position by the flight guidance computer 10 makes it possible to optimize the latency time and therefore the precision of the comparison, in particular with respect to a standard architecture for which the position is hybridized in a flight management system before being used by a multi-mode landing aid receiver.

The invention claimed is:

1. A system for piloting an aircraft during an autonomous approach for the purpose of landing, said piloting system comprising:

information sources comprised of:

a flight management computer that extracts information from a database connected to the flight management computer and determines from the extracted information a virtual approach axis for the aircraft, and a positioning system configured for determining an actual three-dimensional position of the aircraft from onboard devices and for determining precision and integrity levels of the actual three-dimensional position of the aircraft;

a processor comprising a flight guidance computer, wherein said flight guidance computer comprises:

i) a first calculator that receives information characterizing the virtual approach axis determined by the flight management computer and the actual three-dimensional position of the aircraft determined by the positioning system, and directly calculates, from the received information characterizing the actual three-dimensional position of the aircraft and the virtual approach axis, perpendicular linear distances between the actual three-dimensional position of the aircraft and the virtual approach axis, wherein the perpendicular linear distances represent a first distance calculated in a horizontal plane and a second distance calculated in a vertical plane, ii) a second calculator that further receives the information characterizing the virtual approach axis determined by the flight management computer and the actual three-dimensional position of the aircraft determined by the positioning system, and calculates, from the received information characterizing the actual three-dimensional position of the aircraft and the virtual approach axis, lateral and vertical angular deviations between the actual three-dimensional position of the aircraft and the virtual approach axis, and iii) a third calculator that calculates aircraft piloting setpoints from the perpendicular linear distances calculated by said first calculator;

a piloting aid configured to receive the aircraft piloting setpoints and assist in guiding the aircraft to land according to the aircraft piloting setpoints;

a display and control system that displays the lateral and vertical angular deviations calculated by the second calculator; and a warning and surveillance system that carries out surveillance from the lateral and vertical angular deviations.

2. The piloting system as claimed in claim 1, wherein the piloting aid is an autopilot.

3. An aircraft, comprising the piloting system of claim 1.

4. The piloting system as claimed in claim 1, wherein the positioning system is further configured to dispatch a message to the flight management computer to display the autonomous approach unavailable, in the event that precision and integrity level of the current, actual three-dimensional position of the aircraft are determined by the positioning system to be below a required performance level.

* * * * *